United States Patent [19]
Fuji et al.

[11] Patent Number: 5,202,730
[45] Date of Patent: Apr. 13, 1993

[54] DEVELOPING PROCESS USING TWO-COMPONENT TYPE MAGNETIC DEVELOPER

[75] Inventors: Kazuo Fuji, Higashi; Akira Nakakuma, Takaishi; Noriaki Tsubota, Himeji; Masahiko Kubo, Yao; Kazuhisa Edahiro, Hirakata, all of Japan

[73] Assignee: Mita Industrial Co., Ltd., Osaka, Japan

[21] Appl. No.: 723,212

[22] Filed: Jun. 28, 1991

[30] Foreign Application Priority Data
Jun. 29, 1990 [JP] Japan ................... 2-172860

[51] Int. Cl.⁵ ............................... G03G 15/09
[52] U.S. Cl. ................... 355/251; 118/657; 355/246; 430/122
[58] Field of Search ......... 355/251, 250, 253, 246, 355/265, 77; 118/653, 654, 656, 657, 658, 623, 689; 430/122

[56] References Cited
U.S. PATENT DOCUMENTS
4,949,127 8/1990 Matsuda et al. ........... 430/122 X
4,954,404 9/1990 Inoue et al. ............... 430/122 X

*Primary Examiner*—A. T. Grimley
*Assistant Examiner*—Shuk Y. Lee
*Attorney, Agent, or Firm*—Sherman and Shalloway

[57] ABSTRACT

Disclosed is a developing process using a two-component type magnetic developer, where the main pole of developing magnetic poles in the developing sleeve is arranged upstream of the position, where a photosensitive drum becomes closest to the developing sleeve, in the rotation direction of the developing sleeve, this closest position between the drum and the developing sleeve is included in a region where the flux density in the magnetic force distribution of the main pole decreases toward the downstream side in the rotation direction of the sleeve, an alternating current voltage is applied between the developing sleeve and the drum to form an alternating electric field between the highest voltage and lowest voltage of the electrostatic latent image and in this state the development is carried out. According to this process, the conditions required for the supply of the developer are considerably moderated and an image having a high quality can be advantageously obtained.

9 Claims, 4 Drawing Sheets

DEVELOPING PROCESS USING TWO-COMPONENT TYPE MAGNETIC DEVELOPER

BACKGROUND OF THE INVENTION

Field of the Invention

The present invention relates to a magnetic brush developing process using a magnetic carrier, which is used for the electrophotographic process or electrostatic printing process. More particularly, the present invention relates to a developing process in which scattering of a toner is prevented, both a good image density and a good line reproducibility can be simultaneously attained, and formation of sweeping traces by a magnetic brush and accumulation of dusts in the periphery of a dot image area can be prevented.

Description of the Related Art

In the electrophotographic process and the like, a toner image is obtained by using a two-component developer comprising an electroscopic toner and a magnetic carrier, supplying this developer onto a magnetic sleeve to form a magnetic brush, and bringing this magnetic brush into sliding contact with an electrostatic latent image carrier on which an electrostatic latent image is formed.

In this magnetic brush developing process, a good compatibility between the toner and carrier is important for forming a high-density image without scattering of the toner and maintaining these characteristics over a long period of time. Namely, if the charging characteristics of the toner and carrier in the two-component type developer are satisfactory, it is expected that even if the toner concentration is high, the image density will be high and scattering of the toner will be reduced. However, this feature cannot be substantially realized by a commercially available toner or according to a practical developing method. The reasons are considered to be as follows.

In the production of a toner, if the content of a charge-controlling agent is low or any charge-controlling agent is not contained, improper toner particles are inevitably formed at a certain ratio, and such improper toner particles are always contained in commercially available toners. Furthermore, in the practical developing operation, the charge-controlling agent is lost from the toner by mechanical shocks and the like in a developing device, and toner particles having a reduced content of the charge-controlling agent are inevitably formed at a certain ratio. Still further, uncharged particles, to which necessary charges are not given because of changes of the area ratio of an original or environmental changes, are contained in the toner. For these reasons, scattering of the toner is caused to occur substantially inevitably, resulting in contamination of the interior of a copying machine, and contamination of prints.

In general, increase of the toner concentration results in insufficient frictional charging of the toner and reduction of the capacity of bonding to the carrier, and coming and going of the toner in the developing device becomes conspicuous and therefore, scattering of the toner tends to increase. Accordingly, in the conventional developing process using a two-component type developer, in order to prevent scattering of the toner, the toner concentration is set at a relatively low level. However, if the toner concentration is set at a low level, the developing efficiency is reduced and the image density, a more important factor, is lowered. Thus, it is not easy to form a high-density image while preventing scattering of the toner.

In Japanese Patent Application No. 01-308902, as the means for overcoming these disadvantages, we proposed a developing process using a two-component type developer comprising a magnetic carrier and a toner, where scattering of the toner is effectively prevented, based on the finding that in the development of this type, the flowing state of the developer passing through a developing zone is important and if developing conditions are set within certain ranges relatively to this flowing state, even when the toner concentration is relatively high and insufficiently charged particles are contained, scattering of the toner can be effectively prevented. In this developing process, the ratio of the volume occupied by the two-component type developer in the volume of the developing zone between the latent image carrier and the developing sleeve is a critical factor and by maintaining this volume ratio at a level of from 33% to 40%, an image having a high density is obtained while preventing scattering of the toner.

Recently, however, by the optimum image density is meant the image density at which not only an ordinary image but also a fine line image or a dot image (digital image by laser exposure or the like) is faithfully reproduced. Even if the developing conditions are set according to our previously proposed developing process, though a high-density image can be obtained, the thickness of fine lines becomes uneven or scattering of the toner is caused in a portion surrounding the dot image because the quantity of the toner supplied to the line area or dot area is inevitably increased. Especially, the reproducibility of the halftone by the digital image is degraded. Furthermore, a sweeping trace by the magnetic brush is often formed in the image area, and the image quality is still insufficient and improvement is desired.

SUMMARY OF THE INVENTION

It is therefore a primary object of the present invention to provide a developing process using a two-component type developer, in which a high image density and a good line reproducibility are maintained while preventing a scattering of the toner and an image having a good quality can be obtained.

Another object of the present invention is to provide a developing process using a two-component type developer, in which occurrence of bad influences by uncharged and weakly charged particles is eliminated and a sweeping trace by the magnetic carrier is not formed in the image-forming area.

More specifically, in accordance with the present invention, there is provided a developing process comprising supplying a two-component type magnetic developer comprising a magnetic carrier and a toner to a developing zone by a rotary developing sleeve and developing an electrostatic latent image formed on a support arranged to confront the developing sleeve in the developing zone, wherein the main pole of developing magnetic poles in the developing sleeve is arranged upstream of the position, where the support becomes closest to the developing sleeve, in the rotation direction of the developing sleeve, said closest position between the support and the developing sleeve is included in a region where the flux density in the magnetic force distribution of the main pole decreases toward the downstream side in the rotation direction of the sleeve, an alternating current voltage is applied between the developing sleeve and the support to form an alternating electric field between the highest voltage and lowest voltage of the electrostatic latent image, and the development is carried out while supplying the developer so that the occupancy ratio R of the developer in the developing zone, defined by the following formula (1):

$$R = M \times (T/D \times 1/\rho t + C/D \times 1/\rho c)/H \qquad (1)$$

wherein M represents the amount (g/cm$^2$) of the developer delivered per unit area of the sleeve, H represents the distance (cm) between the support and the developing sleeve at the position where both are closest to each other, T/D represents the concentration (% by weight) of the toner in the developer, C/D represents the concentration (% by weight) of the carrier in the developer, $\rho t$ represents the true density (g/cm$^3$) of the toner, and $\rho c$ represents the true density (g/cm$^3$) of the carrier, satisfies the requirement of $30 < R < 75$.

DETAILED DESCRIPTION OF THE INVENTION

The present invention is based on the novel finding that when the main pole of developing magnetic poles in the developing sleeve is arranged to satisfy certain conditions, even if the developer occupancy ratio R defined by the above-mentioned formula (1) is changed over a broad range, the flowing state of the developer in the developing zone (developing space) can be prominently improved, both of the image density and fine line reproducibility can be simultaneously increased while effectively preventing scattering of the toner, and not only scattering of the toner in the portion surrounding a dot image but also formation of a sweeping trace by the magnetic carrier can be prevented.

Figure 1:
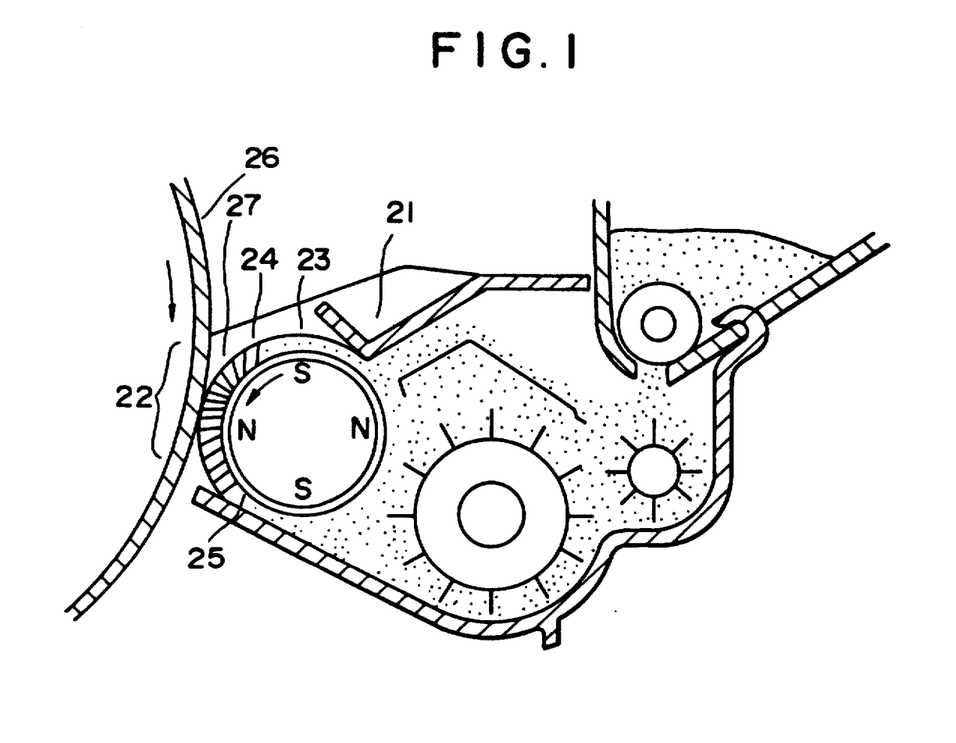
FIG. 1 is a sectional view showing the entire structure of an ordinarily used developing apparatus.

The developer occupancy ratio R is a non-dimensional quantity and indicates the volume ratio (%) of the volume occupied by the two-component type developer in the volume of the developing zone. The value R defines the flowing state of the developer in the developing zone and dominates the toner-supplying capacity and the force of controlling scattering of the toner. More specifically, referring to FIG. 1 showing the section of an ordinary developing apparatus, as the developer occupancy ratio R of the developer 23 arriving at a developing zone 22 through a brush cutter 21 decreases, the volume occupied by the developer in the developing zone becomes small, and a magnetic brush 24 formed in this zone sucks air from above the valley 27 between a developing sleeve 25 and an image carrier 26 and delivers the air to below the valley between the developing sleeve 25 and the image carrier 26 to tend to generate an air current. Accordingly, the toner is scattered to the outside of the developing device (not shown) together with the air current. If the developer occupancy ratio R is further reduced, not only scattering of the toner but also reduction of the image density by degradation of the toner-supplying capacity is caused. In contract, if the developer occupancy ratio R becomes too large, the developer tends to be stuffed in the valley 27 between the electrostatic latent image carrier 26 and the developing sleeve 25 and the developer is not allowed to flow smoothly, and therefore, a considerable load is imposed on the developing sleeve, with the result that the sleeve is not smoothly rotated and a turbulence is given to the developer, and scattering of the toner is caused.

In Japanese Patent Application No. 01-308902, we showed that the developer occupancy ratio R is preferably in the range of from 33 to 40%. According to the present invention, by arranging the main pole of the developing magnetic poles in the developing sleeve under certain conditions as described in detail hereinafter, this preferred range of the developer occupancy ratio is expanded to a range of from 30 to 75%, and even if the development is carried out under this broadened developer occupancy ratio condition, an image having a high image quality can be obtained.

Figure 2A:
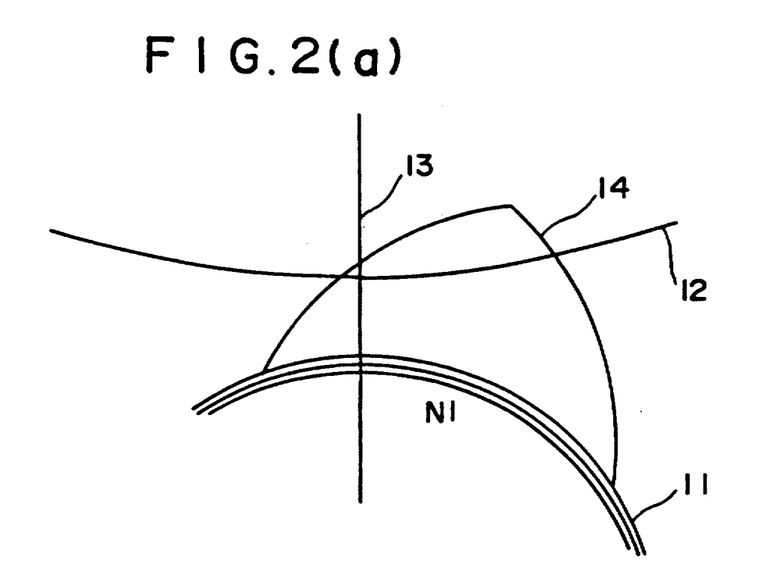
FIG. 2(a) and FIG. 2(b) are diagrams showing main parts of the developing apparatus for use in carrying out the developing process of the present invention.
Figure 2B:
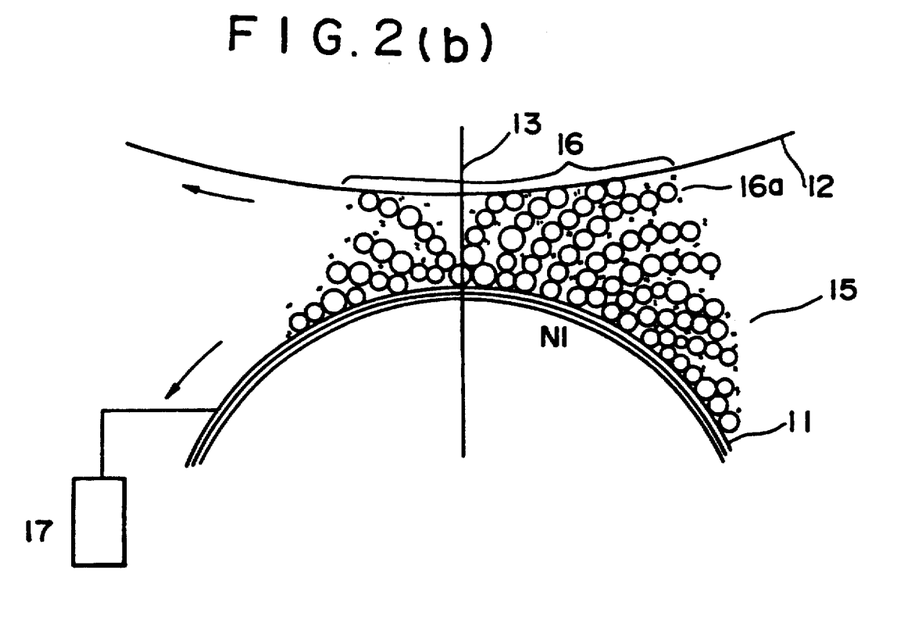

FIG. 2 is a diagram illustrating the positional relationship of the main pole of the developing magnetic poles in the developing sleeve adopted in the process of the present invention. Namely, FIG. 2(a) shows the magnetic force distribution on the developing sleeve and FIG. 2(b) shows the magnetic brush of the developer on the developing sleeve. In the drawings, a drum-shaped electrostatic latent image carrier (support) 12 is closest to the developing sleeve 11 at a position on a straight line 13, and both of the carrier 12 and the sleeve 11 are rotated in the direction indicated by arrows.

In the present invention, the main pole N1 of the developing magnetic poles is located upstream of the developing sleeve 11 over the above-mentioned position, and the above-mentioned position 13 is increased in the region where the magnetic force distribution 14 of he main pole N1 decreases toward the downstream side in the rotation direction of th developing sleeve. Namely, the magnetic brush (developer) 15 formed in correspondence to the magnetic force distribution 14 has a largest earing height at a development-initiating (sliding contact-initiating) position 16a in the developing zone 16 and the earing height is gradually reduced. In this state, the development (sliding contact) is carried out. Accordingly, the development-initiating position 16a can be set on an upstream side of the rotation direction of the electrostatic latent image carrier as compared with the position in the conventional technique. Furthermore, since the earing brush height is gradually decreased, the length of the region of the sliding contact of the magnetic brush with the electrostatic latent image carrier can be increased. Accordingly, engulfing of the air current can be more effectively prevented, and the toner can be sufficiently supplied while reducing the peripheral speed of the sleeve.

Figure 3:
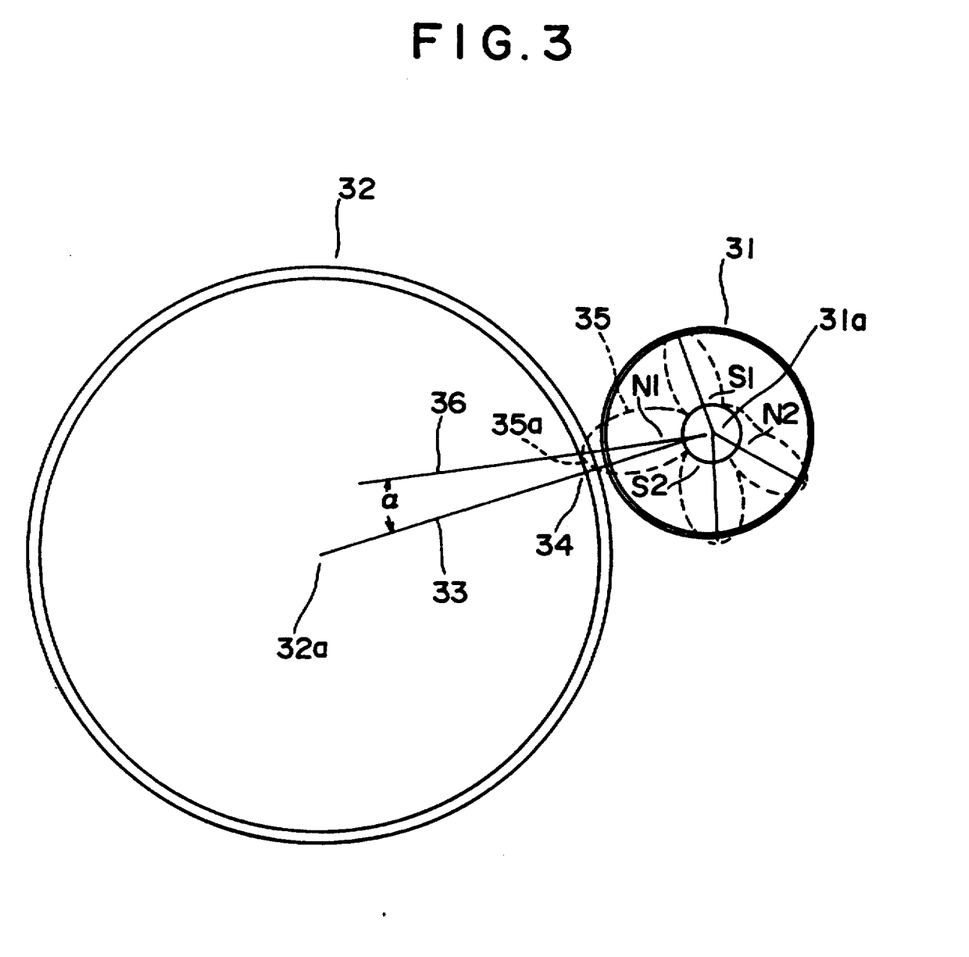
FIG. 3 is a diagram showing positions of developing magnetic poles in the developing sleeve in the developing apparatus for use in carrying out the developing process of the present invention.

A specific example of this positional relationship of the developing magnetic poles is illustrated in FIG. 3. Namely, the position of the main pole N1 of the developing magnetic poles in a developing sleeve 31 is set so that a straight line 36 connecting the main pole N1 to the center 31a of the developing sleeve 31 is deviated by a predetermined angle (α) to the upstream side of the rotation direction of the sleeve from a straight line 33 connecting the center 32a of an electrostatic latent image carrier 32 to the center 31a of the developing sleeve 31, and the region 35a where the flux density of the magnetic force distribution 35 of the main pole N1 is arranged to confront the position 34 closest to the image carrier 32. The degree of the deviation of the main pole of the developing magnetic poles in the developing sleeve to the upstream side in the rotation direction of the developing sleeve depends on the diameter and rotating speed of the developing sleeve and the like, but when the diameter of the developing sleeve is 9 to 50 mm, the angle α is generally adjusted to 2° to 30° and preferably adjusted to 8° to 20°. It is especially preferred that the angle α be adjusted to 8° to 20° and the developer occupancy ratio defined above be adjusted to 30 to 65%. If the angle α is smaller than 2°, it becomes difficult to improve the image quality and expand the effective developer occupancy ratio. If the angle α is larger than 30°, the sliding contact region is narrowed and the image density tends to decrease.

In the present invention, the developing magnetic poles arranged in the developing sleeve can comprise, as shown in FIG. 3, a developing main pole N1, a brush-cutting pole S1, a pumping electrode N2 and a developer-recovering pole S2. Instead of this four-pole type, there can be adopted a five-pole type further comprising a pole exerting the developer-exchanging function. Each of these developing magnetic poles is composed of magnetic field-generating means such as a permanent magnet or an electric magnet.

The magnetic intensity of the main pole N1 of the developing magnetic poles is preferably 600 to 1200 Gauss, and in view of the image quality, it is especially preferred that the magnetic intensity of the main pole N1 be 700 to 1000 Gauss. A magnetic intensity of 500 to 1000 Gauss, especially 650 to 850 Gauss, is appropriately selected for the other developing magnetic poles.

A known developing sleeve can be used as the developing sleeve in the present invention, and for example, stainless steel and aluminum are used as the material of the developing sleeve. From the viewpoint of the developer-delivering property, sand-blast aluminum is especially preferably used.

Figure 4A:
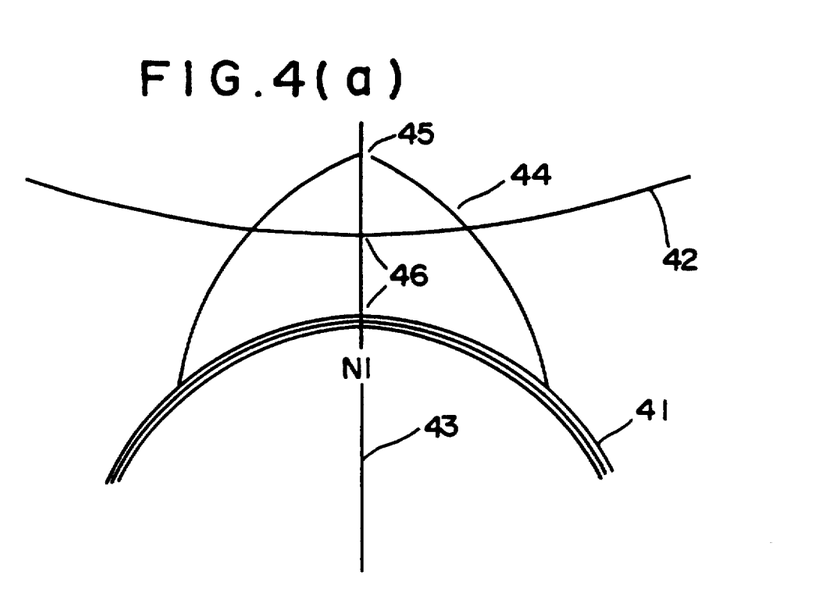
FIG. 4(a) and FIG. 4(b) are diagrams showing main parts of the developing apparatus for use in carrying out the conventional developing process.
Figure 4B:
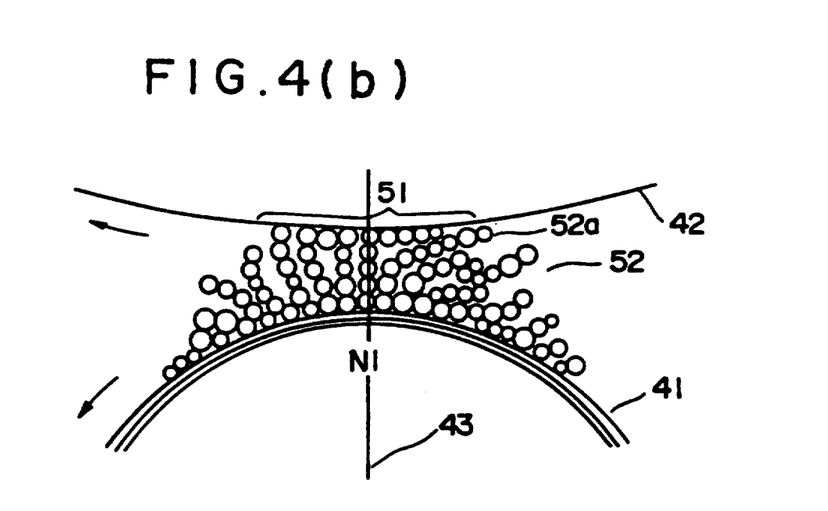

FIG. 4(a) shows the conventional positional relationship between the developing sleeve and the image carrier. Since the main pole N1 is located on a straight line 43 connecting the center (not shown) of an image carrier 42 to the center (not shown) of a developing sleeve 41, the region 45 of a maximum flux density within a magnetic force distribution 44 overlaps a position 46 where the developing sleeve 41 is closest to the image carrier 42, in a developing zone (ranging from the development-initiating point to the development-terminating point) 51 shown in FIG. 4(b), the density of a magnetic brush 52 is high and the magnetic brush 52 is hard, and therefore, the freedom of a carrier 52a is reduced and a toner image (not shown) once formed on the image carrier 42 is disturbed.

In the present invention, it is important that as shown in FIG. 2(b), an alternating current voltage forming an alternating electric field between the maximum voltage and minimum voltage of the electrostatic latent image should be applied to the developing sleeve 11 from a power source 17. By applying such an alternating current voltage, as the flux density decreases, with advance of the sliding contact, the freedom of each magnetic brush increases while each magnetic brush delicately moves, and the sliding contact pressure of the magnetic brush is reduced and the unnecessary toner scattered in the non-image area is picked up. Accordingly, deviation of a line image, formation of a sweeping trace by the magnetic brush and scattering of the toner in the non-image area (especially the portion surrounding the dot image) can be controlled.

The alternating current voltage applied to the developing sleeve may be one having a peak voltage between the maximum voltage and minimum voltage of the electrostatic latent image, and the intensity of the alternating current voltage is preferably 60 to 90% of the voltage difference between the maximum voltage and minimum voltage of the electrostatic latent image. A direct current voltage can be applied together with the alternating current voltage. In this case, a direct current voltage having the same polarity as that of the electrostatic latent image and corresponding to 10 to 120% of the maximum voltage of the electrostatic latent image can be applied.

In the present invention, if the peak value of the alternating current voltage forming the alternating electric field becomes too large and exceeds the range between the maximum voltage (dark area voltage) and minimum voltage (bright area voltage), vibrations of the magnetic brush become too violent, and such troubles as formation of an uneven image, fogging of the image, scattering of the toner and falling of the carrier particles are often induced.

In the developing process of the present invention, the conditions concerning the brush cutting length, the peripheral speed of the developing sleeve and the developer can optionally be determined, so far as the developer occupancy ratio R satisfies the requirement of $30 < R < 75\%$. In general, however, the following conditions are adopted.

In view of the stability of the angles of the magnetic poles to assembling errors, it is preferred that the brush cutting mechanism be arranged between the pole S1 and the pole N1 in FIG. 3. The brush cutting length depends on the magnetic intensity, but it is preferred that the brush cutting length be 0.5 to 1.8 mm, especially 0.6 to 1.6 mm.

The difference of the peripheral speed between the electrostatic latent image carrier and the developing sleeve has influences on the amount of the developer delivered on the developing sleeve and the sliding contact pressure of the formed magnetic brush on the image carrier, and therefore, in view of these influences, it is preferred that the difference of the peripheral speed be set at 30 to 600 mm/sec, especially 60 to 300 mm/sec.

A magnetic carrier having a density ρc of 3.50 to 6.50 g/cm$^3$, especially 4.00 to 5.50 g/cm$^3$, is preferably used, though the preferred density changes to some extent according to the carrier density C/D. For example, known carriers such as triiron tetroxide, ferrite and iron powder can be used. A ferrite carrier is especially preferably used.

It is preferred that the average particle size of the magnetic carrier be set at 20 to 200 μm, especially 40 to 130 μm, and it also is preferred that the saturation magnetization of the magnetic carrier be 30 to 70 emu/g, especially 53 to 65 emu/g.

The electric resistance of the carrier is preferably such that the resistivity is $5 \times 10^8$ to $5 \times 10^{11}$ Ω-cm, especially $1 \times 10^9$ to $1 \times 10^{11}$ Ω-cm.

A coloring toner having both of electroscopic and coloring properties can be used as the toner in the present invention. In general, resin particles comprising, dispersed therein, a coloring pigment, a charge controlling agent and the like, which have a particle size of 5 to 30 μm and a density $\rho t$ of 1.00 to 1.40 g/cm$^3$, especially 1.1 to 1.30 g/cm$^3$, are used as the toner in the present invention. As the binder resin of the toner, there can be used a thermoplastic resin, an uncured thermosetting resin and a precondensate thereof. As preferred examples, there can be mentioned, in order of importance, a vinyl aromatic resin such as polystyrene, an acrylic resin, a polyvinyl acetal resin, a polyester resin, an epoxy resin, a phenolic resin, a petroleum resin and an olefin resin.

For example, at least one member selected from the group consisting of carbon black, cadmium yellow, molybdenum orange, Pyrazolone Red, Fast Violet B and Phthalocyanine Blue can be used as the coloring pigment.

For example, oil-soluble dyes such as Nigrosine Base (CI 50415), Oil Black (CI 26150) and Spilon Black, metal salts of salicylic acid, naphthoic acid and naphthenic acid, metal soaps of fatty acids, metal soaps of resin acids and metal-containing azo dyes can be used as the charge controlling agent according to need.

Preferably, the toner has a resistivity of $1 \times 10^8$ to $3 \times 10^9$ Ω-cm, especially $2 \times 10^8$ to $8 \times 10^9$ Ω-cm, and it is preferred that the dielectric constant of the toner be from 2.5 to 4.5, especially from 3.0 to 4.0.

The toner weight ratio T/D in the developer is preferably in the range of from 0.03 to 0.10, especially from 0.035 to 0.080. In order to attain the objects of the present invention, it is preferred that the resistivity of the developer as a whole be $1 \times 10^9$ to $1 \times 10^{11}$ Ω-cm, especially $5 \times 10^8$ to $4 \times 10^{10}$ Ω-cm.

The delivery quantity M of the developer depends on the flux density of the developing sleeve, the brush cutting length, the physical properties of the developer and the peripheral speed of the developing sleeve, and the delivery quantity M can be adjusted to an appropriate level by controlling these factors.

The distance between the developing sleeve and the electrostatic latent image carrier depends on the particle size of the carrier, the magnetic intensity of the developing magnetic poles and the peripheral speed of the developing sleeve, but it is generally preferred that this distance be adjusted to 0.04 to 0.2 cm, especially 0.06 to 0.1 cm.

All of photosensitive materials heretofore used in the electrophotographic process, for example, a selenium photosensitive material and an organic photosensitive material can be used as the electrostatic latent image carrier (support) in the present invention. In general, the carrier is used in the form of a drum.

The present invention will now be described in detail with reference to the following experiments.

EXPERIMENT 1

Under developing conditions described below, images were formed by using a developer having a toner true density of 1.11 g/cm$^3$, a carrier true density of 5.0 g/cm$^3$ and a toner weight ratio of 5% while changing the delivery quantity of the developer and the position of the main pole.

Distance between drum and sleeve: 0.07 cm
Sleeve/drum peripheral speed ratio: 2.0
Main pole intensity: 980 Gauss (peak value of flux distribution)
Voltage of electrostatic latent image: −700 to −85 V
Development bias voltage: −400 V (direct current voltage)

The obtained results are shown in Table 1.

TABLE 1

| Sample No. | Delivery Amount M | Toner Weight Ratio T/D | True Density $\rho t$ of Toner | Carrier Weight Ratio C/D | True Density $\rho c$ of Carrier | Drum/Sleeve Distance (cm) |
|---|---|---|---|---|---|---|
| 1 | 0.084 | 5 | 1.11 | 95 | 5 | 0.07 |
| 2 | 0.094 | 5 | 1.11 | 95 | 5 | 0.07 |
| 3 | 0.111 | 5 | 1.11 | 95 | 5 | 0.07 |
| 4 | 0.121 | 5 | 1.11 | 95 | 5 | 0.07 |
| 5 | 0.148 | 5 | 1.11 | 95 | 5 | 0.07 |
| 6 | 0.186 | 5 | 1.11 | 95 | 5 | 0.07 |
| 7 | 0.223 | 5 | 1.11 | 95 | 5 | 0.07 |
| 8 | 0.235 | 5 | 1.11 | 95 | 5 | 0.07 |

| Sample No. | Developer Occupancy Ratio (%) | Tilting Angle α of the Mail Pole | Image Density of Solid Portion | Scattering of Toner and Fogging | Resolving Power | Sweeping Trace of Brush | Remarks |
|---|---|---|---|---|---|---|---|
| 1 | 28.2 | 15 | 1.78 | X | 5.0 | ○ | |
| 2 | 31.8 | 15 | 1.81 | ○ | 5.0 | ○ | |
| 3 | 37.3 | 15 | 1.85 | ○ | 5.0 | ○ | |
| 4 | 40.6 | 15 | 1.88 | ○ | 5.6 | ○ | |
| 5 | 49.7 | 15 | 1.91 | ○ | 5.0 | ○ | |
| 6 | 62.5 | 15 | 1.89 | ○ | 4.5 | Δ | |
| 7 | 74.9 | 15 | 1.91 | Δ | 4.5 | Δ | |
| 8 | 78.9 | 15 | 1.87 | X | 4.0 | X | Stuffing of developer |

The image density was measured by using a densitometer (supplied by Sakura), and a value of 1.80 to 2.0 is preferable. The unit of the resolving power is lines/mm. Scattering of the toner and fogging were evaluated based on the value measured by the densitometer (supplied by Sakura) and the visual inspection of the interior of the copying machine according to the following rating:

○: good
Δ: fair
X: bad

The sweeping trace by the carrier was evaluated based on the visual inspection and by using an image analysis apparatus. Mark "○" indicates no sweeping trace, mark "Δ" indicates that some sweeping trace was found but no practical problem arose and mark "X" indicates a sweeping trace obviously confirmed by the visual inspection.

EXPERIMENT 2

Under developing conditions of sample 6 in Experiment 1, the tilting angle α of the main pole was gradually increased to 20°, 25°, 30° and 35°. At 35°, the image density was drastically reduced.

EXPERIMENT 3

Under developing conditions of sample 2 in Experiment 1, the tilting angle α of the main pole was decreased to 10°, 5° and 0°. At 0°, scattering of the toner, fogging and formation of a sweeping trace by the brush became conspicuous.

EXPERIMENT 4

Under developing conditions of samples 2 through 6 in Experiment 1 and Experiments 2 and 3 (the tilting angle of the main pole was adjusted to 5°, 10°, 20°, 25° and 30°), in addition to the direct current voltage, an alternating current voltage (1) peak-to-peak: −150 V to −650 V, (2) peak-to-peak: −150 V to −800 V, (3) peak-to-peak: −50 V to −650 V or (4) peak-to-peak: −50 V to −750 V was applied as the bias voltage, and images were formed. Under the alternating current voltage (1), the image characteristics were not substantially different from those obtained when only the direct current voltage alone was applied, but scattering of the toner around lines and dot images was obviously reduced and sharper images were obtained. Under the alternating current voltage (2), scattering of the toner was more conspicuous than when the direct current voltage alone was applied, and also fogging became obvious. Under the alternating current voltage (3), adhesion of the carrier was caused, though this was not observed when the direct current voltage alone was applied. Under the alternating current voltage (4), scattering of the toner was conspicuous and the image quality was irregular, as compared with the case where the direct current voltage alone was applied.

From the results obtained in Experiments 1 through 4, it will readily be understood that according to the developing process of the present invention, the range of the effective developer occupancy ratio is expanded, and the image quality is highly improved.

We claim:

1. A developing process comprising supplying an amount of a two-component type magnetic developer comprising a magnetic carrier and a toner to a developing zone by a rotary developing sleeve and developing an electrostatic latent image formed on a support arranged to confront the developing sleeve in the developing zone, the carrier and the toner each have a true density, the carrier and the toner each comprise a percentage by weight concentration of the developer, the rotary developing sleeve has a position which is closest to the support and the sleeve contains therein a main pole of developing magnetic poles, and the main pole exhibits a flux density in magnetic force distribution of the main pole, wherein the main pole of developing magnetic poles in the developing sleeve is arranged upstream of the position, where the support becomes closest to the developing sleeve, in the rotation direction of the developing sleeve, said closest position between the support and the developing sleeve is included in a region where the flux density in the magnetic force distribution of the main pole decreases toward the downstream side in the rotation direction of the sleeve, an alternating current voltage is applied between the developing sleeve and the support to form an alternating electric field between the highest voltage and the lowest voltage of the electrostatic latent image, and the development is carried out while supplying the developer so that the occupancy ratio R of the developer in the developing zone, defined by the following formula:

$$R = M \times (T/D \times 1/pt + C/D \times 1/pc)H$$

wherein M represents the amount (g/cm²) of the developer delivered per unit area of the sleeve, H represents the distance (cm) between the support and the developing sleeve at the position where both are closest to each other, T/D represents the concentration (% by weight) of the toner in the developer, C/D represents the concentration (% by weight) of the carrier in the developer, $pt$ represents the true density (g/cm³) of the toner, and $pc$ represents the true density (g/cm³) of the carrier, satisfies the requirement of $30 < R < 75$, and wherein the electrostatic latent image support has a drum-like shape, and the main pole deviates by 2° to 30° toward the upstream side of the rotation direction of the developing sleeve from a line connecting the center of the drum to the center of the developing sleeve.

2. A developing process according to claim 1, wherein the peak value of the alternating current voltage is 60 to 90% of the voltage difference of the maximum voltage and minimum voltage of the electrostatic latent image.

3. A developing process according to claim 1, wherein a direct current voltage is applied between the developing sleeve and the electrostatic latent image support.

4. A developing process according to claim 3, wherein the direct current voltage has the same polarity as that of the electrostatic latent image and is 10 to 120% of the maximum voltage of the electrostatic latent image.

5. A developing process according to claim 1, wherein the electrostatic latent image support has a drum-like shape, and the main pole deviates by 8° to 20° toward the upstream side of the rotation direction of the developing sleeve from the line connecting the center of the drum to the center of the developing sleeve.

6. The process of claim 1 wherein an alternating current voltage having a peak-to-peak value of −150 V to −650 V is applied as a bias voltage.

7. The process of claim 1 wherein the occupancy ration R of the developer is 30 to 65%.

8. A developing process comprising supplying an amount of a two-component type magnetic developer comprising a magnetic carrier and a toner to a developing zone by a rotary developing sleeve and developing an electrostatic latent image formed on a support arranged to confront the developing sleeve in the developing zone, the rotary developing sleeve has a position which is closest to the support and contains therein a main pole of developing poles, and the main pole exhibits a flux density in magnetic force distribution of the main pole, wherein the main pole of developing magnetic poles in the developing sleeve is arranged upstream of the position, where the support becomes closest to the developing sleeve, in the rotation direction of the developing sleeve, said closest position between the support and the developing sleeve is included in a region where the flux density in the magnetic force distribution of the main pole decreases toward the downstream side in the rotation direction of the sleeve, an alternating current voltage is applied between the developing sleeve and the support to form an alternating electric field between the highest voltage and lowest voltage of the electrostatic latent image, and the development is carried out while supplying the developer so that the amount of the developer occupying the developing zone is 30 to 65% of the volume of the developing zone, and wherein the electrostatic latent image support has a drum-like shape, and the main pole deviates by 8° to 20° toward the upstream side of the rotation direction of the developing sleeve from a line connecting the center of the drum to the center of the developing sleeve.

9. The process of claim 8 wherein an alternating current voltage having a peak-to-peak value of $-150$ V to $-650$ V is applied as a bias voltage.

* * * * *